July 16, 1940.  T. G. SCHMEISER  2,207,825
TRACTION DEVICE FOR RUBBER TIRED TRACTOR WHEELS
Filed Jan. 28, 1938  2 Sheets-Sheet 1

INVENTOR
*T. G. Schmeiser*
BY
ATTORNEY

July 16, 1940.  T. G. SCHMEISER  2,207,825
TRACTION DEVICE FOR RUBBER TIRED TRACTOR WHEELS
Filed Jan. 28, 1938  2 Sheets-Sheet 2
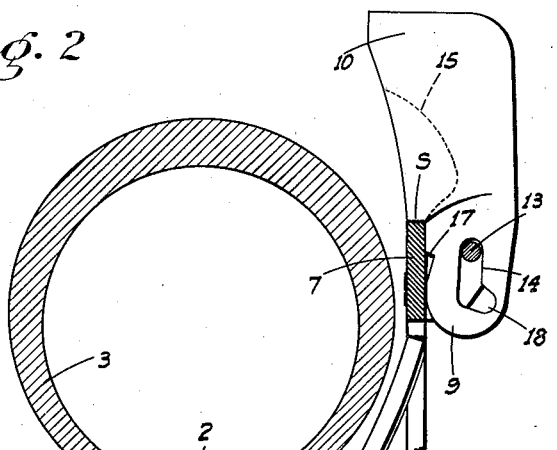
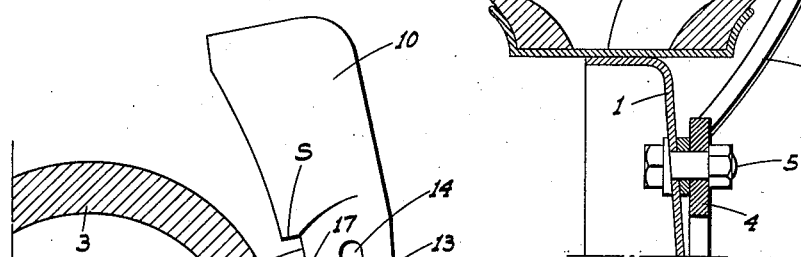
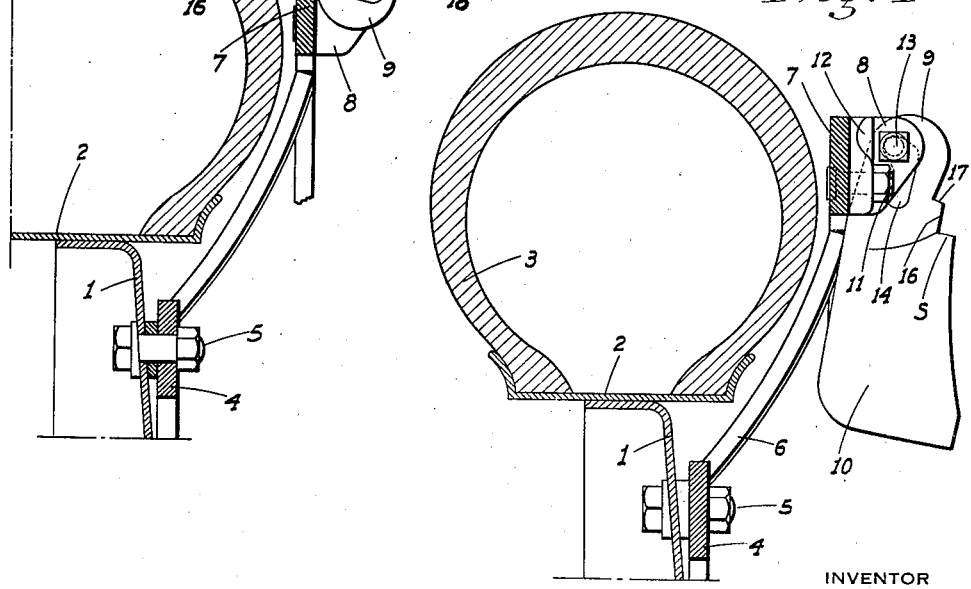
INVENTOR
T. G. Schmeiser
BY
ATTORNEY Patented July 16, 1940

2,207,825

UNITED STATES PATENT OFFICE 2,207,825

TRACTION DEVICE FOR RUBBER TIRED TRACTOR WHEELS

Theodore G. Schmeiser, Fresno, Calif.

Application January 28, 1938, Serial No. 187,417

9 Claims. (Cl. 301—50)

This invention relates generally to traction increasing devices for tractor wheels, and particularly is directed to a traction increasing attachment for tractor wheels equipped with rubber tires. As to all common subject matter, the present application is a continuation of my now abandoned application Ser. No. 146,329 filed June 4, 1937.

In order to prevent slippage of these rubber tires under certain working conditions it is customary to load the wheels with extra weight, sometimes as much as 1000 pounds per wheel in order to create sufficient weight for proper traction. As the tread of the tire becomes worn and smooth and the tractive action is lessened, it is necessary to either add more weight to the wheels or apply some traction increasing device such as chains. Chains, however, are difficult to install and the operators are disinclined to remove them when once applied, and further the chains are very severe on the tires as is well known and both chains and tires wear out quickly if the chains are used excessively. Also the chains cease to be very effective as soon as they become worn or are clogged with dirt.

The principal object of my invention is to eliminate the use of such chains and the accompanying annoyance and operating cost by the provision of a grouser or lug unit which may be removably or permanently applied to the tractor wheel, and on which unit the lugs are so mounted that they may be easily and quickly shifted from an operative to an inoperative position and visa versa without removing the attachment from the wheel. In this manner the lugs may be used only on those spots of a piece of land where extra traction is required, such as a wet place, and the lugs may be quickly rendered inoperative after such places have been worked. Also no additional wear is placed on the tires even if the lugs are left in an operating position indefinitely.

An additional object of my invention is to provide a traction increasing lug unit, for tractor wheels arranged so that the lugs may be secured in selected projecting positions radially of the wheel and depending on the increased traction required.

It is also my object to provide a novel arrangement for rigidly holding the lugs in operative or inoperative position.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a fragmentary and enlarged section on line 2—2 of Fig. 1.

Figure 3 is a similar view but with the lug adjusted to project a greater distance radially of the wheel.

Figure 4 is a fragmentary and enlarged radial section on line 4—4 of Fig. 1.

Figure 1:
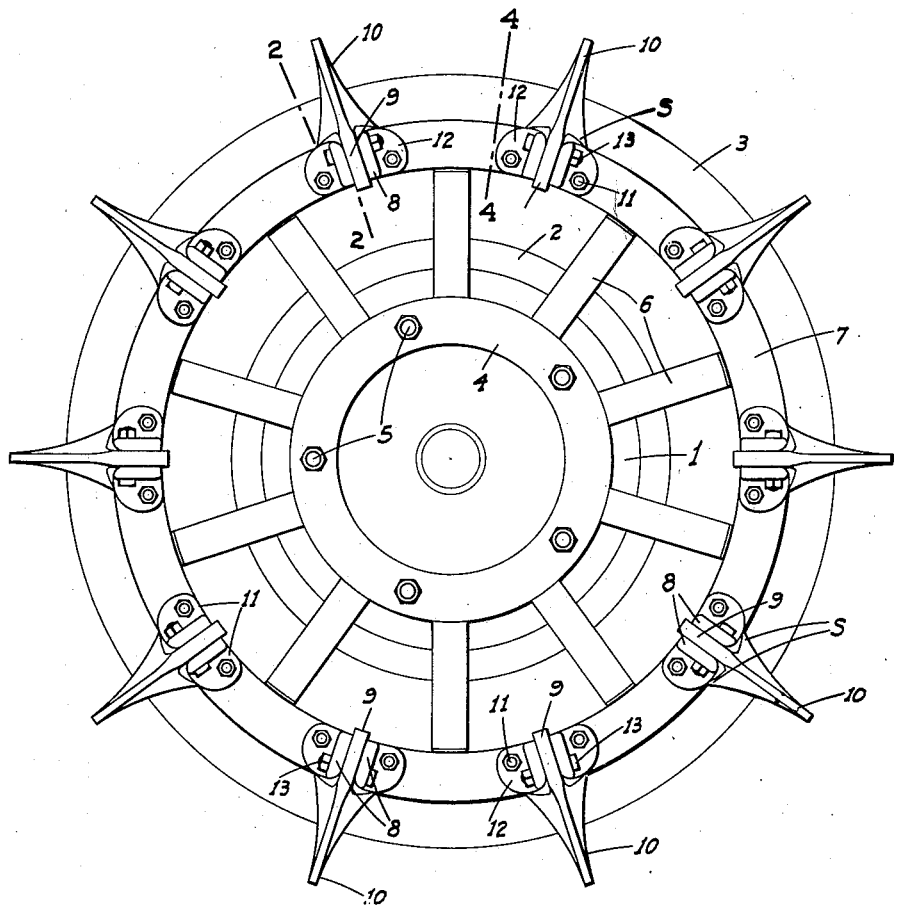
Figure 1 is a side elevation of a tractor wheel with my attachment mounted thereon and with the lugs disposed in an operative position.

Referring now more particularly to the characters of reference on the drawings, 1 denotes a tractor wheel in general, having a tire engaging rim 2 on which a conventional rubber tire 3 is mounted. Disposed on the wheel 1 on the outside and inwardly of the rim a certain distance is a circular band 4 concentric with the rim, secured in place by suitable means such as bolts 5, the form of securing means of course depending on whether the wheel is of the disc or spoke type. Radiating from the band and secured thereon are curved arms 6, deflecting outwardly to miss the time as shown in Fig. 2 and supporting another circular band 7 at their outer ends, this band being concentric with the tire and band 4 and disposed substantially in the central plane thereof.

Projecting outwardly from and pivoted on the band at evenly spaced intervals intermediate the arms are pairs of ears 8, between which the shanks 9 of grousers or lugs 10 project. The ears are pivoted by means of bolts 11 which extend through the ear flanges 12 adjacent their inner edges. Each lug shank is secured between the corresponding pair of ears 8 by means of a bolt 13 which projects through one end of a slot 14 extending longitudinally in the shank. The bolt 13 is offset from bolts 11 radially of the wheel so that when the nut of bolt 13 is tightened, the ears 8 pivot on bolts 11 and positively engage and clamp the shank. In this manner the lugs can be rigidly secured in operative or inoperative position.

In end elevation the lugs are considerably wider at their base than the shanks and taper in substantially wedge-shaped form to their outer ends as shown in Fig. 1. Such lugs at the base project, when in an operative position, beyond the shanks in the direction of the tire to form shoulders S.

The lugs are hollowed out on the tire side, as at 15, so that said shoulders S are disposed at the outer extremities of the base. The lugs are so designed that when in an operative position radially of the wheel, they extend outwardly of the tire a certain distance and also overhang the tire to a certain extent as shown in Figs. 2 and 3.

The usual operative position of the lugs is disclosed in Fig. 2 of the drawings, the lugs being disposed radially of the wheel and projecting outwardly of the tire. The shoulders S rest on circular band 7 and thus prevent rocking movement of the lugs in the direction of rotation of the wheel. When the lugs are in this operative position and the bolts 13 located in the outer ends of slots 14, it will be seen that it is impossible for the lugs to swing laterally away from the tire on account of the engagement of the relatively flat side of the shanks with the adjacent face of the band 7. This avoids the necessity for full reliance of the ears against the shanks to hold the lugs in such operative position.

The edges 16 of the shanks below the shoulders S are step-cut as at 17. The purpose of such step-cutting is to permit the lugs to be adjusted so as to project a greater distance outwardly of the tire when additional traction is desired. When the lugs are so adjusted, the step-cut portions 17 rest on circular band 7 as clearly shown in Fig. 3, and the lugs are also tilted so that they are disposed in greater overhanging relation to the tire than when disposed in the usual operative position illustrated in Fig. 2. In either operative position the cleats do not touch the tire and do not wear or deteriorate the same in any way.

When the use of the lugs is no longer required, bolts 13 are loosened and the lugs first moved radially out until the bolts 13 engage in the other or inner ends of the slots, and then the lugs are pivoted about the bolts until said lugs project inward toward the wheel axis as shown in Fig. 4. The slots adjacent said other or inner end are bent or deflected, as at 18, in a direction toward the tire when the lugs are in an inoperative position so that said lugs may swing in and be disposed as close to the tire as possible.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A traction device for a tractor wheel, said device comprising a band, means adapted to secure the band on one side of the wheen, a plurality of pairs of spaced ears projecting laterally from the band, each ear being pivoted on the band independently of the adjacent ear for independent swivel movement relative thereto, a plurality of lugs having shanks, each shank being disposed between a pair of ears, and means pivoting the shanks between said ears whereby the lugs may be swung from an outwardly to an inwardly projecting position relative to the band; said last named means comprising a bolt projecting through each pair of ears and the intermediate shank, said bolt being offset from the pivotal axis of the ears in a radial direction.

2. A traction device for a tractor wheel, said device comprising a band, means adapted to secure the band on one side of the wheel, a plurality of pairs of spaced ears projecting laterally from the band, each ear including a flange engaging the band in face to face relation, a bolt pivoting each flange on the band, a plurality of lugs having shanks, each shank being disposed between a pair of ears, and another bolt pivoting each shank between the adjacent ears whereby the lugs may be swung from an outwardly to an inwardly projecting position relative to the band; said other bolts being offset from said first named bolts in a radial direction.

3. A traction device for a tractor wheel, said device comprising a band adapted to be mounted on one side of the wheel, a plurality of pairs of spaced ears projecting laterally from the band, a plurality of lugs having relatively long shanks thereon, each shank being slotted lengthwise and disposed between a pair of ears, and a bolt extending through the ears of each pair and through the slot in the corresponding shank; the slot in each shank being arranged so that the shank edge adjacent the band engages the same when the lug is disposed in an outwardly projecting position and the bolt rests in the outer end of the slot whereby to then prevent pivotal movement of the shank and lug about the bolt.

4. A traction device for a tractor wheel, said device comprising a band adapted to be mounted on one side of the wheel, a plurality of pairs of spaced ears projecting laterally from the band, a plurality of lugs, shanks extending from the lugs, said shanks being slotted lengthwise, and disposed between the ears of corresponding pairs, bolts projecting through the ears of each pair and riding in the shank slots; the radially outer end of the slots extending axially inward when the lugs are disposed to extend from the bolts inward toward the wheel axis.

5. A traction device for a tractor wheel comprising an endless band adapted to be mounted on one side of the wheel concentric therewith, pairs of spaced ears projecting laterally from the band, a plurality of lugs including shanks projecting between the ears of corresponding pairs, each shank having a longitudinal slot, a bolt mounted in the corresponding ears and projecting through the slot, a shoulder formed on each lug overhanging and engaging the outer edge of the band when the bolt is adjacent the radially outermost end of the slot, the lug then projecting radially out from the band, and another shoulder formed on the shank of the lug radially inward from said first named shoulder to also overhang and engage the outer edge of the band when the lug is shifted radially outward a corresponding amount.

6. A traction device for a traction wheel, said device including a band adapted to be mounted on one side of the wheel, a plurality of pairs of spaced ears, each ear being separately pivoted on the band for independent swinging movement, a plurality of lugs having shanks, each shank being disposed between a pair of ears and adapted to be clamped therebetween, and an element extending through the ears of each pair and arranged to swing said ears about their pivots and to engage and clamp said shanks.

7. A traction device for a traction wheel, said device including a band adapted to be mounted on one side of the wheel, a plurality of pairs of spaced ears, each ear being separately pivoted on the band for independent swinging movement, a plurality of lugs having shanks, each shank being disposed between a pair of ears and adapted to be clamped therebetween, and an element extending through the ears of each pair, and through the corresponding shank in pivotal relation thereto, and arranged to swing said ears about their pivots and to engage said ears with and clamp said shanks.

8. A device as in claim 7 in which said element is a bolt, and in which said bolt is offset relative to the ear pivots in a radial direction.

9. A traction device for a tractor wheel, said device comprising a band adapted to be mounted on one side of the wheel, a plurality of pairs of spaced ears projecting laterally from the band, a plurality of lugs having shanks thereon, each shank being slotted lengthwise and disposed between a pair of ears, and a bolt projecting through the ears of each pair and riding in the slot of the corresponding shank; each lug being adapted to pivot about the corresponding bolt from a radially outwardly projecting position to a radially inwardly projecting position, the edge of each shank adjacent the band engaging the same and preventing pivotal movement of the corresponding lug except when the bolt rests in the slot at a point adjacent the slot end which is remote from the lug end of said shank.

THEODORE G. SCHMEISER.